United States Patent
Crosby et al.

(10) Patent No.: US 11,646,896 B1
(45) Date of Patent: May 9, 2023

(54) SYSTEMS AND METHODS FOR VERIFICATION AND AUTHENTICATION OF REMOTE SENSING IMAGERY

(71) Applicant: National Technology & Engineering Solutions of Sandia, LLC, Albuquerque, NM (US)

(72) Inventors: Sean Michael Crosby, Albuquerque, NM (US); William Marchetto, II, Albuquerque, NM (US); Kurt Daniel Brenning, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 113 days.

(21) Appl. No.: 17/231,377

(22) Filed: Apr. 15, 2021

(51) Int. Cl.
*H04L 9/32* (2006.01)
*H04N 1/32* (2006.01)
*H04N 7/18* (2006.01)

(52) U.S. Cl.
CPC .......... *H04L 9/3247* (2013.01); *H04L 9/3278* (2013.01); *H04N 1/32144* (2013.01); *H04N 7/183* (2013.01)

(58) Field of Classification Search
CPC . H04L 9/3247; H04L 9/3278; H04N 1/32144; H04N 7/183
See application file for complete search history.

(56) References Cited

U.S. PATENT DOCUMENTS

| | | | |
|---|---|---|---|
| 7,904,730 B2 | 3/2011 | Proudler et al. | |
| 8,122,255 B2 | 2/2012 | Merrill | |
| 10,931,467 B2* | 2/2021 | Wallrabenstein | ..... H04L 9/3221 |
| 2020/0118405 A1 | 4/2020 | Benson et al. | |
| 2021/0279469 A1* | 9/2021 | Holland | ............... G06V 10/141 |

OTHER PUBLICATIONS

Degnan, et al., "Laser Ranging to GPS Satellites with Centimeter Accuracy", In GPS World, Sep. 1994, pp. 62-70.
Gilbert, et al., "YouProve: Authenticity and Fidelity in Mobile Sensing", In Proceedings of the 9th ACM Conference on Embedded Networked Sensor Systems, 2011, pp. 176-189.
Haider, et al., "Private Space Monitoring with SoC-based Smart Cameras", In 2017 IEEE 14th International Conference on Mobile Ad Hoc and Sensory Systems (MASS), 2017, pp. 19-27.

(Continued)

*Primary Examiner* — Jeffrey C Pwu
*Assistant Examiner* — Mayasa A. Shaawat
(74) *Attorney, Agent, or Firm* — Calfee, Halter & Griswold LLP; Samantha Updegraff

(57) ABSTRACT

A system for generating and authenticating remote sensing imagery includes a remote sensing platform. The remote sensing platform includes an imaging sensor and a hardware logic device that is directly coupled to the imaging sensor. The hardware logic device receives image data from the imaging sensor and generates a cryptographic signature based upon the image data. The hardware logic device outputs a signed image that includes the image data and the cryptographic signature. A computing device operated by a downstream user receives the signed image and can determine whether the image data has been modified from its original content based upon the cryptographic signature.

20 Claims, 8 Drawing Sheets

(56) References Cited

OTHER PUBLICATIONS

Hamlet, et al., "Modelling-Resistant Physical Unclonable Functions", Sandia National Laboratories, SAND2014-20306C, Dec. 1, 2014, 1 Page.

Janjua, et al., "Trusted Operations on Sensor Data", In Sensors (Basel), Apr. 27, 2018, vol. 18, No. 5, 21 Pages.

Price, et al., "How to Generate Repeatable Keys Using Physical Unclonable Functions", In Department of Computer Science and Electrical Engineering, 9 Pages.

* cited by examiner

SYSTEMS AND METHODS FOR VERIFICATION AND AUTHENTICATION OF REMOTE SENSING IMAGERY

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Improvements in electronics design, space-launch capabilities, and other technologies have enabled the deployment of small, inexpensive satellites for purposes such as communications, remote sensing, etc. These satellites can generate useful remote sensing data that is often unavailable through other means (e.g., satellite images of agricultural fields, animal migrations, or human activities of interest). However, remote sensing data generated by satellites can be subject to subversion between generation of the data on a satellite and delivery of that data to an end-user. For instance, a satellite can be configured to capture images of a region on Earth, and to transmit those images to a ground station for further processing and/or dissemination of the images. As the images are transmitted from one system to another (e.g., for the purposes of image processing, storage, or dissemination to end users), an attacker or other untrusted entity can intercept the images and alter the content of the images such that the images are no longer true images of the region. For example, an image can be modified in order to obscure the presence of an object in an image.

SUMMARY

The following is a brief summary of subject matter that is described in greater detail herein. This summary is not intended to be limiting as to the scope of the claims.

An exemplary imaging system includes an imaging objective, an image sensor, a hardware logic device, and a transmitter. In non-limiting embodiments, the imaging system can be or be mounted on a platform such as a spacecraft or aircraft. The imaging objective receives light from a scene within a field-of-view (FOV) of the imaging objective, such as a region of the Earth. The imaging objective focuses or otherwise directs the light to an imaging sensor, which is configured to output image data that are indicative of light received by the imaging sensor. In exemplary embodiments, the imaging sensor can be configured to output digital values that are indicative of intensities of light received at various light-sensitive pixel cells (LSPCs) included on the imaging sensor. In other embodiments, the imaging sensor can be configured to output analog values that are indicative of the intensities of light, wherein the analog values can be digitally sampled to facilitate digital image processing techniques.

The hardware logic device is directly coupled to the imaging sensor. By way of example, and not limitation, the hardware logic device is coupled to the imaging sensor such that the hardware logic device receives the image data directly from the imaging sensor, without the imaging data having been received first by another device. In other words, the hardware logic device receives an output of the imaging sensor that is truly indicative of the light that was received by the imaging sensor. The hardware logic device generates a cryptographic signature based upon the image data received from the imaging sensor. The hardware logic device then outputs a signed image that includes the image data and the cryptographic signature.

Since the hardware logic device is directly coupled to the imaging sensor, the hardware logic device generates the signature based upon true image data, i.e., image data that is actually representative of a scene in the FOV of the imaging objective. Accordingly, if an attacker receives an image signed by the hardware logic device, a downstream user of the image can detect, based upon the cryptographic signature included with the signed image, whether the image has been modified by an attacker. Since the hardware logic device is directly coupled to the imaging sensor, the downstream user can trust that signed images output by the hardware logic device are true images even when the platform on which the hardware logic device is mounted is otherwise untrusted.

In an exemplary embodiment, a computing device receives a signed image generated by the hardware logic device. The computing device can be configured to decrypt the cryptographic signature and to compare the decrypted signature to the image data to determine whether the image data is genuine and unaltered. In other embodiments, the computing device can be configured to execute a cryptographic function over the image data to generate a second cryptographic signature. The computing device can compare the second cryptographic signature to the cryptographic signature included in the signed image. If the cryptographic signatures match, the image data is determined to be genuine. If the cryptographic signatures do not match, the image data is determined not to be genuine, and the computing device outputs an indication that the signed image is not a genuine image of the scene.

In various embodiments, the hardware logic device can generate the cryptographic signature based upon output of a sensor, output of a clock, or metadata generated by substantially any other system that is included on the same remote sensing platform as the hardware logic device. The output of the sensor can be indicative of a physical characteristic of the remote sensing platform or its environment. A clock output used to generate the cryptographic signature can be indicative of a time at which an image was generated by the imaging sensor or a time at which the image was signed by the hardware logic device. In an exemplary embodiment, the sensor and/or clock output can be included in metadata of an image, and the hardware logic device can generate the cryptographic signature by executing a cryptographic function over the image and its metadata.

A computing device that receives a signed image can determine whether the signed image is a genuine image of a scene based upon sensor data recovered from the cryptographic signature or indicated in metadata of the signed image. If the sensor data indicated by the cryptographic signature or the metadata is indicative that the sensor/hardware logic device was subject to conditions (e.g., acceleration, temperature, pressure, time of image capture, time of image signature, etc.) that are inconsistent with an expected position and environment of the remote sensing platform during capture of the signed image, the computing device can output an indication that the signed image is not a genuine image of the scene. If the metadata has been modified by an attacker to indicate false sensor or clock output, the modification can be detected based upon the cryptographic signature The computing device can further determine whether a signed image is a genuine image of a scene based upon observed features depicted or not depicted in the signed image. In an exemplary embodiment, an electromagnetic (EM) emitter in the scene can be configured to emit an EM signal toward the remote sensing platform on which the hardware logic device is or is believed to be mounted. The computing device can be configured to identify the presence of the EM emitter in the scene. If the EM emitter is absent where it should be present, or vice versa, the computing device can determine that the signed image is not genuine.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
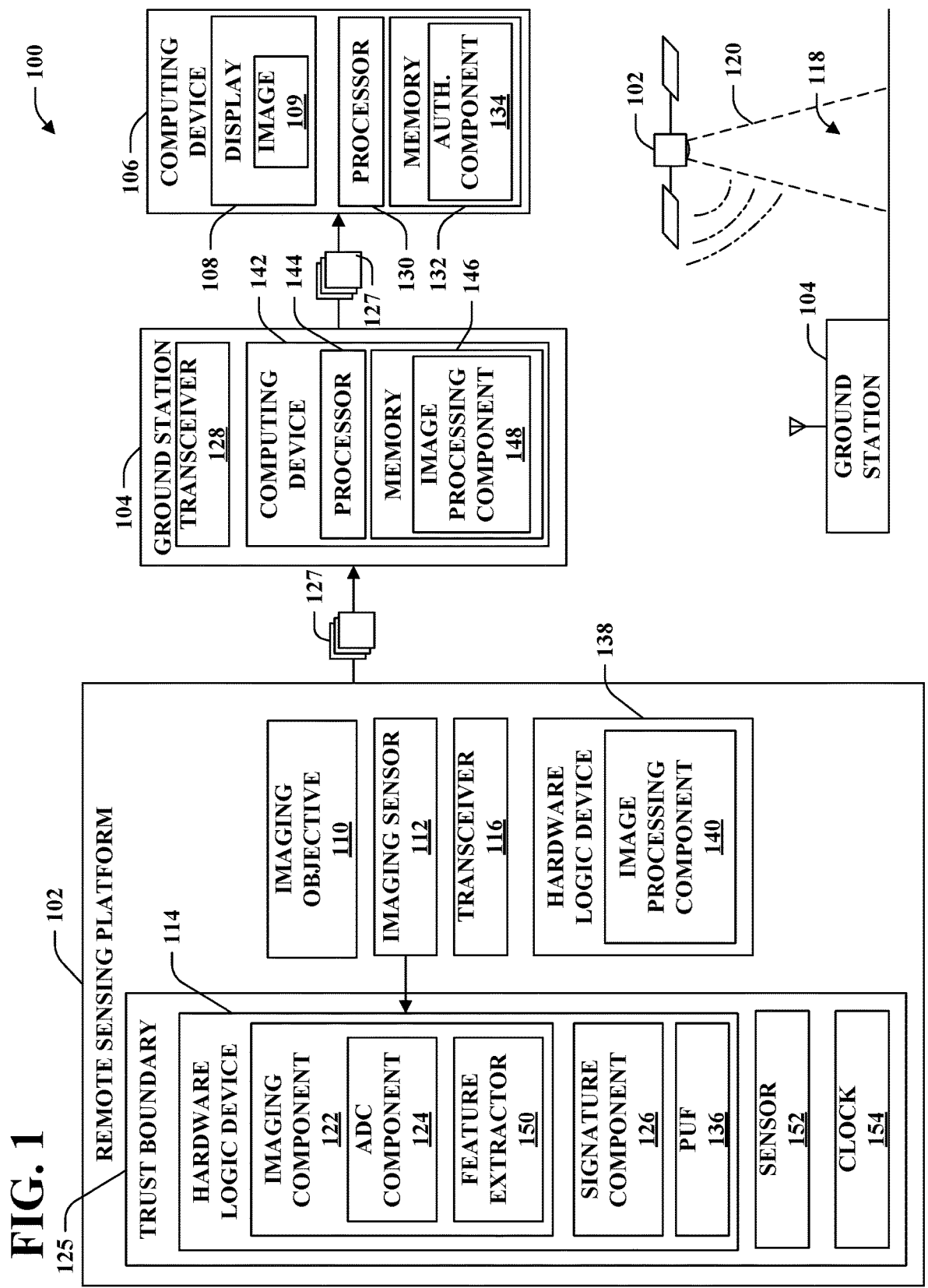
FIG. 1 is a functional block diagram of an exemplary system that facilitates generating and authenticating remote sensing imagery.

Various technologies pertaining to detecting tampering of digital images are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary system 100 that facilitates detection of tampering in digital images is illustrated. The system 100 includes a remote sensing platform 102, a ground station 104, and a computing device 106. In exemplary embodiments, the remote sensing platform 102 can be a spacecraft, such as a satellite, or an aircraft. Briefly, the remote sensing platform 102 is configured to generate images of scenes, such as regions on Earth, and to transmit those images to the ground station 104. The ground station 104 receives the images from the remote sensing platform 102. The ground station 104 can be embodied by or include various elements that are configured to, alone or in concert, receive, process, store, and/or disseminate images that are generated at the remote sensing platform 102. In some embodiments, the ground station 104 is configured to perform various image processing operations over the received images. For example, the ground station can decompress images (e.g., that may be compressed by the remote sensing platform 102 to facilitate transmission to the ground station 104), or perform other image processing operations intended to improve the utility of the images (e.g., by enhancing the visibility of certain desired features). Subsequently, the ground station 104 can transmit the images to the computing device 106, whereupon the images can be displayed to a user on a display 108 (e.g., as the image 109).

It is to be understood that in other embodiments consistent with the present disclosure, the remote sensing platform 102 can transmit images to another remote sensing platform (e.g., a spacecraft or an aircraft) instead of or in addition to transmitting the images to the ground station 104. In still other embodiments, the computing device 106 can be a component of the ground station 104.

As will be described in greater detail below, the remote sensing platform 102 is configured to output a signed image of a scene, wherein the signed image includes a cryptographic signature. A downstream user of the signed image, such as an operator of the ground station 104 or a user of the computing device 106, can verify that the signed image is a genuine image of the scene based upon the cryptographic signature. Stated differently, a user of the signed image can use the cryptographic signature included with the image to determine whether the signed image is a true image of the scene as captured by an imaging objective included on the remote sensing platform.

The remote sensing platform 102 includes an imaging objective 110, an imaging sensor 112, a first hardware logic device 114, and a transceiver 116. The imaging objective 110 is configured to gather light from a scene 118 in an FOV 120 of the objective 110. The imaging objective 110 can comprise a series of lenses, mirrors, and other optical elements configured to collectively gather light from the scene 118 and direct the light onto a surface of the imaging sensor 112.

The imaging sensor 112 is configured to receive light from the imaging objective 110 and to output signals or data indicative of the received light. In an exemplary embodiment, the imaging sensor 112 is a pixelated focal plane array (FPA) that comprises a plurality of LSPCs. Each of the LSPCs can be configured to output a respective signal or data that is indicative of the light received by that LSPC. In various embodiments, the imaging sensor 112 outputs, to the hardware logic device 114, a plurality of digital values, wherein each of the digital values is indicative of light received at a respective LSPC included on the imaging sensor 112. Collectively, these digital values make up an image that comprises a plurality of pixels, each of the digital values being a value of a respective pixel in the image. Accordingly, the digital values output by the LSPCs can be collectively referred to as image data.

In exemplary embodiments, the hardware logic device 114 can be a field-programmable gate array (FPGA) or an application-specific integrated circuit (ASIC). In other embodiments, the hardware logic device 114 can be a computing device that includes a processor and memory. In some embodiments, the hardware logic device 114 can include an imaging component 122 that is configured to generate image files that are interpretable by other hardware logic devices or computing systems (e.g., the computing device 106) based upon image data received from the imaging sensor 112. By way of example, and not limitation, the imaging component 122 can receive digital values from each of a plurality of LSPCs in the imaging sensor 112. The imaging component 122 can then output an image (e.g., of the scene 118) based upon the digital values, wherein the image is in any of various computer-readable formats such as JPEG, BMP, TIFF, PNG, or the like. In some embodiments, the imaging sensor 112 can be configured to output images rather than individual digital pixel values associated with individual LSPCs of the imaging sensor 112. As used herein, the term "image data" is intended to include images or digital pixel values.

In still other embodiments, the imaging sensor 112 can be configured to output analog values that are indicative of light received at LSPCs included on the imaging sensor 112. In such embodiments, the imaging component 122 can be configured to generate images based upon the analog values received from the imaging sensor 112. By way of example, the imaging component 122 can include an analog-to-digital converter (ADC) component 124. The ADC component 124 can include one or more ADCs (not shown) that are coupled to analog outputs of the imaging sensor 112. The ADC component 124 is configured to convert the analog signals received from the imaging sensor 112 to digital values, thereby generating digital image data. The imaging component 122 can then generate an image file based upon the digital image data.

The hardware logic device 114 is directly coupled to the imaging sensor 112. By way of example, and not limitation, the hardware logic device 114 is coupled to the imaging sensor 112 such that the hardware logic device 114 receives analog signals or digital values from the imaging sensor 112 without the signals/values being relayed through or previously received by any other devices. For example, an output terminal of the imaging sensor 112 can be coupled directly to an input terminal of the hardware logic device 114 by way of an electrical conductor. In various embodiments, the imaging sensor 112 is coupled directly to the hardware logic device 114 such that no logic elements capable of performing computing operations (e.g., hardware logic devices, processors, or the like) receive signals or data from the imaging sensor 112 prior to such signals or data being received by the hardware logic device 114. In general, the hardware logic device 114 is configured to receive image data or signals directly from the imaging sensor 112 itself rather than by way of any intermediary devices.

In the description that follows, for the sake of simplicity, the hardware logic device 114 and other components of the system 100 may be described as performing various operations with respect to images generated by the imaging sensor 112 or the imaging component 122. Such description is intended to encompass either or both of image data, such as digital or analog pixel values, or computer-readable image files. Thus, as used herein, the term "image" can refer to one or more analog or digital values that are indicative of light received at an imaging sensor, including, but not limited to, data or signals output by LSPCs included on the imaging sensor 112, digital pixel values included in a computer-readable image file, or a computer-readable image file. In embodiments wherein an image is a computer-readable image file, the computer-readable image file can also include image metadata.

As noted above, the hardware logic device 114 is configured to digitally sign images to facilitate authentication of the images as genuine images of a scene (e.g., the scene 118). The hardware logic device 114 includes a signature component 126. The signature component 126 is configured to generate a cryptographic signature based upon image data that is received from the imaging sensor 112 or generated by the imaging component 122 of the hardware logic device 114 (e.g., based upon signals output by the imaging sensor 112). The cryptographic signature can be included with an image file output by the hardware logic device 114. In an exemplary embodiment, the signature component 126 can append the cryptographic signature to an image file generated by the imaging component 122 (e.g., where the cryptographic signature is generated based upon content of the image file).

The signature component 126 generates the cryptographic signature by executing a cryptographic function based upon the image data. By way of example, and not limitation, the signature component 126 can execute a cryptographic function over the image data to generate the cryptographic signature. Stated differently, the signature component 126 can use the image data as input to the cryptographic function when generating the cryptographic signature. A value of the cryptographic signature is therefore based upon the content of the image data. Responsive to generating the cryptographic signature, the signature component 126 can be configured to append the cryptographic signature to an image to generate a signed image. In other embodiments, the signature component 126 is configured to modify an image file to include the cryptographic signature. By way of example, and not limitation, the signature component 126 can be configured to include the cryptographic signature in metadata of an image file, thereby generating a signed image. In still other embodiments, the signature component 126 can modify the image data itself such that the cryptographic signature is included as a watermark in an image. In such embodiments, an image including the watermark is a signed image. In still further embodiments, the signature component 126 can generate a distinct signature file that includes the cryptographic signature. Subsequently, the hardware logic device 114 can output the signature file and an accompanying image file to the transceiver 116, whereupon the transceiver 116 transmits the image file and the signature file together to the ground station 104.

It is to be understood that the signature component 126 can be configured to generate the cryptographic signature based further upon metadata associated with an image. By way of example, the imaging component 122 can output an image file (e.g., based upon digital pixel values output by the imaging sensor 112), wherein the image file includes image data and metadata. The image data can include a value for each of a plurality of pixels included in the image. The metadata can include substantially any other data pertaining to the image, such as, but not limited to, a timestamp indicating when the image was captured by the imaging sensor 112 or signed by the signature component 126, a make, model, or other description of the imaging objective 110 and/or the imaging sensor 112, or configuration settings of the imaging objective 110 and/or imaging sensor 112. In exemplary embodiments, the signature component 126 can be configured to generate the cryptographic signature by executing a cryptographic function over both the image data and the metadata.

In some embodiments, the signature component 126 can be configured to include a cryptographic signature or a hash of the cryptographic signature of a previously-signed image in the metadata of a signed image. In a non-limiting example, the signature component 126 generates a first cryptographic signature for a first image and outputs a first signed image that includes the first cryptographic signature. Furthering the example, the signature component 126 receives a second image. The signature component 126 can update metadata of the second image to include the first cryptographic signature or a hash of the first cryptographic signature. The signature component 126 can then generate a second cryptographic signature for the second image. The signature component 126 outputs a second signed image that includes the second cryptographic signature and that has the first cryptographic signature or the hash of the first cryptographic signature in its metadata. The inclusion of the first cryptographic signature or its hash in the metadata of the second signed image links the two images in a chain, whereby modification of prior images in the chain can be detected based upon subsequent images in the chain. Accordingly, unless the attacker modifies all subsequent images in the chain, modification of a prior image can be detected, even if its cryptographic signature is somehow compromised. It is to be understood that the chain can be continued for substantially any number of images.

Responsive to generating a signed image, the hardware logic device 114 can output the signed image to the transceiver 116. The transceiver 116 transmits signed images 127 to the ground station 104. The ground station 104 includes a transceiver 128 that is configured to receive the signed images 127 from the transceiver 116. The ground station 104 can retransmit the images 127 to the computing device 106 (e.g., by way of a network such as the Internet, an intranet, or a local area network).

Subsequent to an image of the scene 118 being generated by the imaging sensor 112 or the imaging component 122, an attacker can alter content of the image. For example, an attacker can subvert the ground station 104 in order to modify the images before they reach a downstream user (e.g., a user of the computing device 106). In other examples, an attacker can intercept images as they are transmitted to the ground station 104 or as they are communicated from the ground station 104 to one or more end-user devices, such as the computing device 106. The attacker can alter the intercepted images before they are received by an end-user, and thus images received by an end-user may not be genuine images of scenes captured by the imaging objective 110 (e.g., the scene 118). In still further embodiments, the attacker can alter the signed images 127 after they are received by the computing device 106 (e.g., by way of malware installed on the computing device 106) and prior to viewing of the images by the user of the computing device 106.

Figure 2:
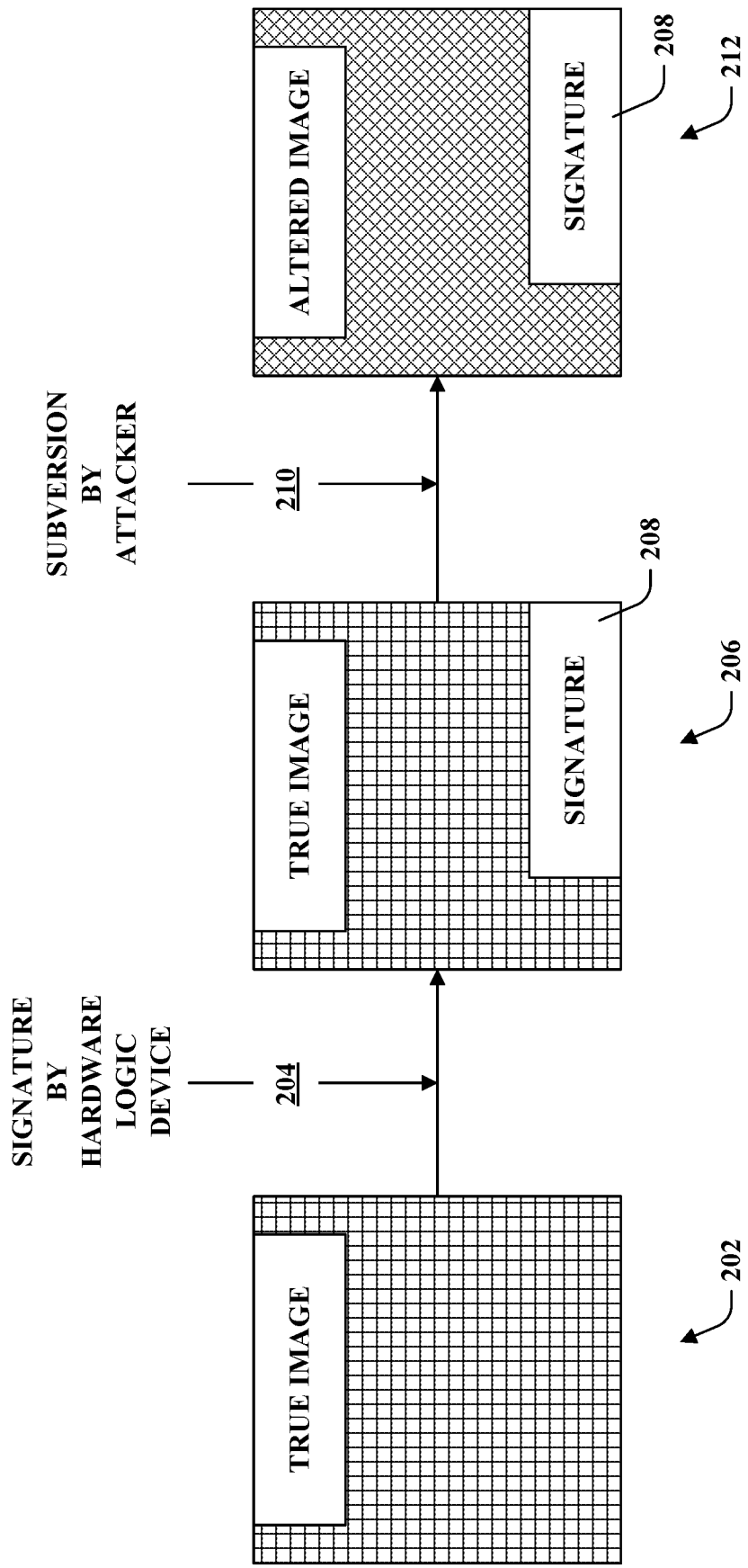
FIG. 2 is a conceptual diagram illustrating an exemplary chain of custody of a remote sensing image.

In the exemplary system 100, alteration of image data from its original content (e.g., as output by the imaging sensor 112) can be detected based upon a comparison of a signed image and its accompanying cryptographic signature. With reference now to FIG. 2, an exemplary chain-of-custody of an image is shown. Initially, a true image 202 of a scene is generated by an imaging sensor (e.g., the imaging sensor 112). The true image 202 of the scene represents the scene as viewed through an imaging objective and focused onto the imaging sensor. The true image 202 is signed at 204 by a hardware logic device (e.g., the hardware logic device 114), yielding a signed true image 206 that includes a cryptographic signature 208. The signed true image 206 is then subject to subversion by an attacker at 210, yielding an altered image 212. The altered image 212 can fail to depict one or more features of the scene that are shown in the true image 202 (and the signed true image 206), or can depict features that are not actually present in the scene. Thus, the altered image 212 is considered not to be a genuine image of the scene. However, the cryptographic signature 208 can be representative of content of the true image 202, such that alteration of the signed true image 206 by the attacker at 210 can be detected based upon the altered image 212 and the signature 208.

The computing device 106 can include a processor 130 and memory 132 that stores instructions that are executed by the processor 130. The memory 132 includes an authentication component 134. The authentication component 134 is configured to verify that a signed image received by the computing device 106 is genuine based upon a cryptographic signature included with the signed image. The computing device 106 receives a signed image. The computing device 106 can receive the signed image from the ground station 104 (e.g., among the signed images 127) or from another device in an extended chain of custody of the signed image. The signed image can include image data that is purported to be representative of a scene (e.g., the scene 118) viewed by the imaging objective 110 of the remote sensing platform 102, and a cryptographic signature. In exemplary embodiments, the authentication component 134 can decrypt the cryptographic signature and compare the decrypted cryptographic signature against the image data of the signed image. If the decrypted cryptographic signature matches the image data, then the authentication component 134 outputs an indication that the image data is genuine. By way of example, and not limitation, the authentication component 134 can output the indication that the signed image is a genuine image by way of the display 108.

In other embodiments, the authentication component 134 can instead execute a cryptographic function over the image data of the signed image to generate a second cryptographic signature. The authentication component 134 can then compare the second cryptographic signature against the cryptographic signature included in the signed image to determine whether the signed image is genuine. By way of example, and not limitation, the signature component 126 can generate the cryptographic signature that is included with the signed image by executing a cryptographic hash function over image data output by the imaging sensor 112 or received by the signature component 126 from the imaging component 122. Thus, the cryptographic signature can be a cryptographic hash of the original image data output by the imaging sensor 112. Responsive to receipt of the signed image that includes the cryptographic signature, the authentication component 134 can execute the same cryptographic hash function over the image data included in the signed image to generate a second cryptographic signature. If the image data of the signed image received by the computing device 106 is the same as the image data of the signed image as originally output by the imaging sensor 112, the second cryptographic signature will match the cryptographic signature of the signed image. Therefore, if the authentication component 134 determines that the cryptographic signature and the second cryptographic signature match, the authentication component 134 can output an indication that the signed image is a genuine image.

Figure 3:
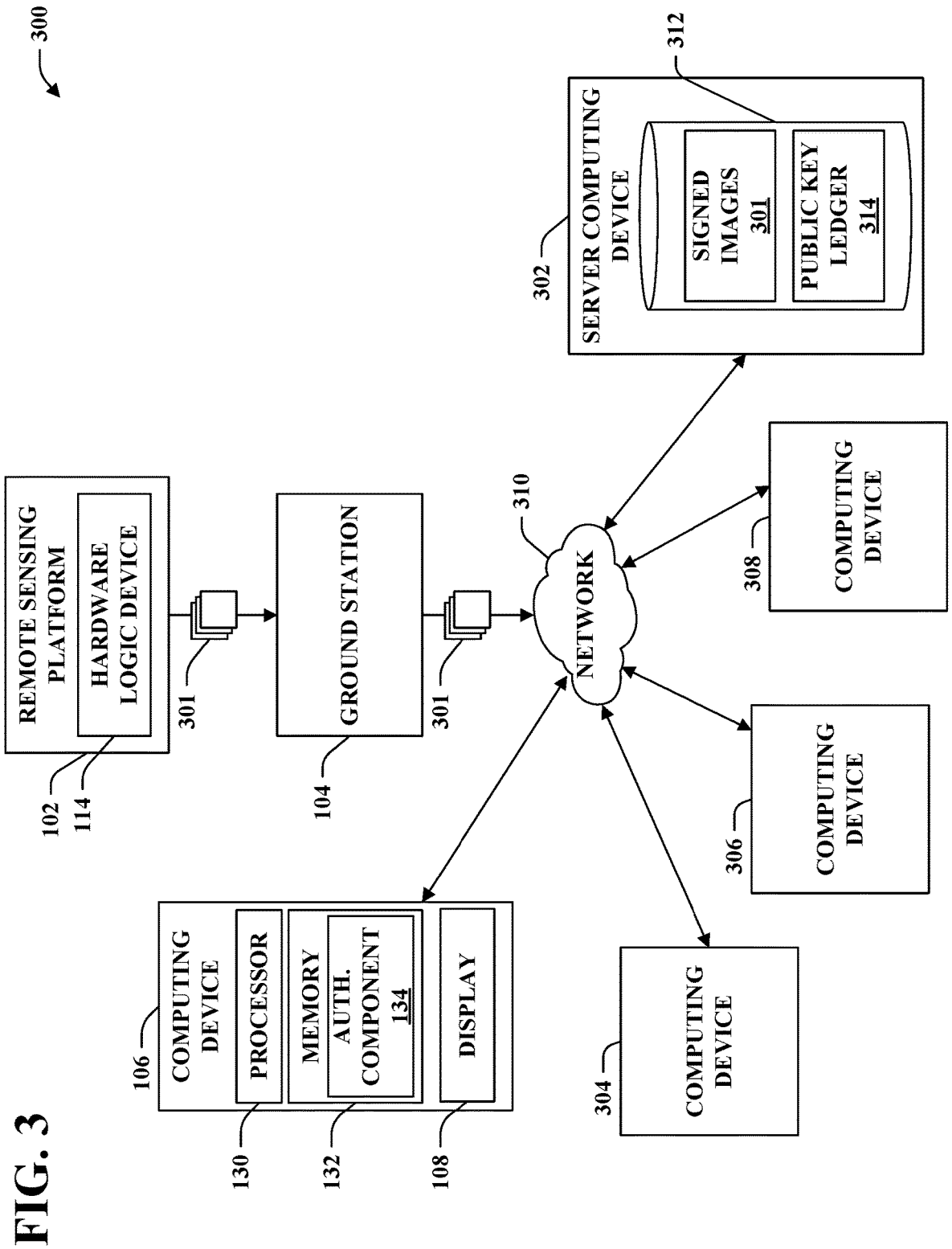
FIG. 3 is a functional block diagram of an exemplary system that facilitates generating and authenticating remote sensing imagery based upon a public/private cryptographic key scheme.

In various embodiments, the cryptographic function employed by the signature component 126 in connection with generating a cryptographic signature can be a public/private key-based function. In such embodiments, when the cryptographic signature is generated based upon a private key, the cryptographic signature can be decrypted by way of a public key associated with the private key. With reference now to FIG. 3, an exemplary system 300 that facilitates authentication of imagery based upon a public-private key scheme is shown. The system 300 includes the remote sensing platform 102, the ground station 104, a server computing device 302, the computing device 106, and a plurality of additional computing devices 304-308. The remote sensing platform 102 is configured to output signed images 301 to the ground station 104, as described above with respect to FIG. 1. A cryptographic signature included in one of the signed images 301 can be generated by the hardware logic device 114 by executing a cryptographic function based upon image data and a private key that is maintained by the hardware logic device, as will be described in greater detail below.

The ground station 104 can be configured to output the signed images 301 to any or several of the computing devices 106, 304-308 by way of a network 310 (e.g., the Internet, an intranet, a local area network, etc.). In other embodiments, the ground station 104 can be configured to output the signed images 301 to the server computing device 302, whereupon the server computing device 302 stores the signed images 301 in a datastore 312 included in the server computing device 302. In still other embodiments, the ground station 104 can be configured to output the signed images 301 to a second server computing device (not shown), which second server computing device can retain the signed images 301 in an image repository. The computing devices 106, 304-308 can then retrieve the signed images 301 from the server computing device 302 (or the second server computing device) by way of the network 310.

The hardware logic device 114 generates cryptographic signatures for the signed images 301 based upon a private key. In an exemplary embodiment, the hardware logic device 114 generates a cryptographic signature for an image by executing a cryptographic function over the image and based upon the private key. The cryptographic function is configured such that the cryptographic signature can be decrypted using a public key that is associated with the private key.

Each of the computing devices 106, 304-308, responsive to receiving a signed image, can authenticate the signed image based upon the cryptographic signature included in the signed image and a public key associated with the private key employed by the hardware logic device 114. The datastore 312 of the server computing device 302 stores a public key ledger 314. The public key ledger 314 comprises an index of public keys and devices associated with the public keys. For example, the public key ledger 314 can include public keys for a plurality of hardware logic devices, each of which is mounted on a different remote sensing platform and/or coupled to a different imaging sensor. The computing devices 106, 304-308 can be configured to retrieve a public key associated with the hardware logic device 114 from the server computing device 302 in order to authenticate the signed images 301.

By way of example, the computing device 106 can receive one of the signed images 301 by way of the network 310. Responsive to receipt of the signed image, the authentication component 134 of the computing device 106 transmits a request for a public key associated with the signed image to the server computing device 302. In order to facilitate identification of a public key that is associated with a signed image by a downstream user, the hardware logic device 114, when generating a signed image, can append identification data to the signed image that is indicative of a public key that can be used to decrypt the cryptographic signature of the signed image. In non-limiting examples, that identification data can include an identifier for the remote sensing platform 102, an identifier for the hardware logic device 114, or an identifier for the public key associated with the private key used to generate the cryptographic signature. In still other embodiments, the identification data can include the public key itself. In such embodiments, it is unnecessary for the authentication component 134 to request the public key from the server computing device 302.

In response to receiving the request from the authentication component 134 of the computing device 106, the server computing device 302 retrieves a public key associated with a signed image based upon the identification data included in the request. The server computing device 302 transmits the public key to the computing device 106 by way of the network 310. Responsive to receiving the public key, the authentication component 134 decrypts the cryptographic signature of the signed image using the public key. Based upon the decrypted cryptographic signature, the authentication component 134 can determine whether the signed image is a genuine image (e.g., that the signed image has a same image content as when it was signed by the hardware logic device 114).

In some embodiments, the hardware logic device 114 can include a physical unclonable function (PUF) that can be used to facilitate use of a private key in connection with generating cryptographic signatures. With reference once again to FIG. 1, the hardware logic device 114 includes a PUF 136. The PUF 136 is a physical device that provides a consistent but non-predictable output responsive to receipt of an input signal, given a same set of input conditions. Stated differently, the PUF 136 provides a same output responsive to receiving a same input at two different times, but the output of the PUF 136 for a given input cannot be predicted in advance of providing that input to the PUF 136 based upon design of the PUF 136.

The signature component 126 of the hardware logic device 114 can be configured to generate cryptographic signatures based upon output of the PUF 136. For example, the signature component 126 can provide a first input to the PUF 136 and receive a first output from the PUF 136, wherein the first output is based upon the first input. In various embodiments, the signature component 126 can be configured to use the first output of the PUF 136 as a first private key for generating cryptographic signatures. In other embodiments, the signature component 126 can use the first output of the PUF 136 as input to a key generation algorithm, wherein an output of the key generation algorithm is then used by the signature component as the first private key. In various embodiments, the signature component 126 can challenge the PUF 136 to generate the first output (e.g., by providing the first input to the PUF 136) each time that the first private key is to be used to generate a cryptographic signature. Hence, the hardware logic device 114 need not store a private key that is used by the signature component 126 to generate cryptographic signatures. Therefore, even if an attacker is able to read data from memory included on the hardware logic device 114, the attacker would be unable to determine the private key used by the signature component 126 without also having access to the PUF 136.

In further embodiments, the hardware logic device 114 can be configured to change a private key that is used for generating cryptographic signatures. For instance, it may be determined that an attacker has compromised the first private key that is used by the signature component 126 to generate cryptographic signatures. A communication can be transmitted to the remote sensing platform 102 (e.g., by way of the ground station 104), wherein the communication is configured to cause the signature component 126 to cease using the first private key to generate cryptographic signatures. Subsequently, the signature component 126 can provide second input to the PUF 136, wherein the second input causes the PUF 136 to provide a second output. The signature component 126 can use the second output of the PUF 136 as a second private key, or as input to a key generation algorithm to generate the second private key. Referring once again briefly to FIG. 3, a second public key that is associated with the second private key can be stored in the public key ledger 314 of the server computing device 302.

Since the second output of the PUF 136 cannot be predicted prior to providing the second input to the PUF 136, a second public key that is associated with the second private key can be generated in advance of the private keys being used by the signature component 126, or can be communicated to the server computing device 302 by hardware logic device 114 (e.g., by way of the ground station 104). For instance, the second input can be provided to the PUF 136 to cause the PUF 136 to provide the second output. The second private key and second public key can be generated by executing a key generation algorithm over the second output of the PUF 136. If the second public key is generated in advance, such as prior to launch of the remote sensing platform 102, the key generation algorithm can be executed by the server computing device 302, and the second public key stored in the public key ledger 314. In other embodiments, the hardware logic device 114 can generate the second private key and second public key subsequent to launch of the remote sensing platform 102 by executing the key generation algorithm over the second output of the PUF 136. The hardware logic device 114 can then communicate the second public key to the server computing device 302 (e.g., by way of the ground station 104). In each case, the private key is not stored at either the server computing device 302 or the hardware logic device 114, and in order to recover the second private key, the hardware logic device 114 need only store the second input to the PUF 136 that is used to cause the PUF 136 to provide the second output.

In some embodiments, one or more of the remote sensing platform 102 or the ground station 104 can be configured to perform image processing over a signed image output by the hardware logic device 114 prior to receipt of the signed image at an end-user device (e.g., the computing device 106). By way of example, and not limitation, the remote sensing platform 102 can be configured to perform compression of the images. Thus, in an exemplary embodiment, the remote sensing platform 102 comprises a second hardware logic device 138 that includes an image processing component 140. The image processing component 140 can be configured to receive signed images from the first hardware logic device 114 and to compress the signed images. The image processing component 140 can be configured to perform substantially any other image or data processing operations, such as data packaging, image focusing, filtering, or the like. The second hardware logic device 138 can be configured to cause the transceiver 116 to transmit the compressed, signed images to the ground station 104.

In some embodiments, the ground station 104 can include a computing device 142 that is configured to perform image processing with respect to the signed images 127 received from the remote sensing platform 102. The computing device 142 can include a processor 144 and memory 146 that includes an image processing component 148 that is executed by the processor 144. The image processing component 148 can be configured to perform image processing functions to enhance the visibility of various features in the signed images 127.

In embodiments wherein image processing of images occurs subsequent to the images being signed by the signature component 126, the signature component 126 can be configured to generate a cryptographic signature in a feature-aware manner. Whereas a cryptographic hash function executed over image data of an image will not yield a same hash value before processing of the image and after processing of the image, various features of the image may be identical or substantially similar as between the pre- and post-processed images. In some exemplary embodiments, the signature component 126 can be configured to execute the cryptographic function over one or more features that are derived from the image data.

The imaging component 122 can include a feature extractor 150. The feature extractor 150 is configured to extract one or more features from images generated by the imaging component 122 or image data output by the imaging sensor 112. By way of example, and not limitation, the feature extractor 150 can extract image features such as a number of pixels exceeding a threshold intensity, a position or number of edges depicted in the image (e.g., as detected by an edge-detection algorithm), a position or number of blobs of a same type in the image, (e.g., regions of pixels having a substantially similar color or regions of pixels having a substantially similar intensity), etc. The feature extractor 150 outputs feature data that is indicative of the extracted features. The signature component 126 can then execute a cryptographic algorithm over the feature data to generate a cryptographic signature that is included in a signed image.

When the computing device 106 receives the signed image, the authentication component 134 can decrypt the cryptographic signature of the signed image to recover the feature data. The authentication component 134 can then compare the feature data against the signed image. By way of example, the authentication component 134 can be configured to perform feature extraction over the signed image to extract features of the signed image. The authentication component can then compare the extracted features against the features indicated in the feature data. While the image data of the signed image may have changed subsequent to the image being signed by the signature component 126 by virtue of image processing performed by the image processing component 140 or the image processing component 148, features identified in the feature data may be preserved by the image processing. Thus, the authentication component 134 can indicate that the signed image is a genuine image provided that the features extracted from the signed image by the authentication component 134 are consistent with the features indicated in the feature data.

In further exemplary embodiments, the signature component 126 can be configured to generate a cryptographic signature based further upon output of a sensor 152 included on the remote sensing platform 102. The sensor 152 can be any of various sensors such as a gravimeter, an accelerometer, a gyroscope or gyrometer, an inertial measurement unit (IMU), a pressure sensor, a thermometer, or the like. For various reasons, output of the sensor 152 can be indicative of a true position of the remote sensing platform 102. For instance, in embodiments wherein the remote sensing platform 102 is a spacecraft, output of a gravimeter, an accelerometer, or a pressure sensor can indicate whether the remote sensing platform 102 is in space or remains on the ground.

Use of output of the sensor 152 by the signature component 126 in connection with generating cryptographic signatures can provide security against an attacker providing false data to the hardware logic device 114. For instance, if the hardware logic device 114 is intended to be launched on a satellite, an attacker may be able to remove the hardware logic device 114 from the satellite prior to launch. The attacker could then provide false image data purporting to be imagery taken by an imaging objective mounted on the satellite as input to the hardware logic device 114. However, it may be difficult to spoof output of a sensor. Thus, generating a cryptographic signature based upon output of the sensor 152 can increase a cost to the attacker of subverting images generated by the remote sensing platform 102.

In an exemplary embodiment, the signature component 126 receives sensor data output by the sensor 152, wherein the sensor data is indicative of one or more physical characteristics of the remote sensing platform 102 (e.g., a linear or angular acceleration of the remote sensing platform 102), or an environment about the remote sensing platform 102 (e.g., temperature or pressure of the environment about the remote sensing platform 102, a gravitational force acting on the remote sensing platform 102). The signature component 126 generates a cryptographic signature for an image based upon image data of the image and the sensor data. Responsive to receiving a signed image that includes the cryptographic signature, the authentication component 134 can decrypt the cryptographic signature to recover the sensor data. The authentication component 134 can then determine whether the image is genuine based upon the sensor data. For example, the recovered sensor data can indicate that the sensor 152 coupled to the hardware logic device 114 was in an environment inconsistent with a known position of the remote sensing platform 102, or a position where the remote sensing platform 102 is expected to be. For instance, in embodiments wherein the sensor 152 is a gravimeter, the sensor 152 can indicate that the sensor 152 (and the hardware logic device 114 to which it is coupled) are on Earth, whereas the remote sensing platform 102 may be expected to be in orbit around the Earth. The authentication component 134 can be configured to determine whether the recovered sensor data is inconsistent with expected conditions of the remote sensing platform 102. Responsive to determining that the recovered sensor data is inconsistent with expected conditions of the remote sensing platform 102, the authentication component 134 can output an indication (e.g., by way of the display 108) that the signed image is not genuine.

The remote sensing platform 102 can further include a clock 154. The clock 154 can output timing data to the hardware logic device 114. The signature component 126 of the hardware logic device 114 can generate the cryptographic signature based further upon the timing data. For example, the signature component 126 can generate a timestamp that is indicative of a current time indicated by the timing data, and the signature component 126 can generate the cryptographic signature based upon the timestamp such that the timestamp is recoverable from the cryptographic signature by decrypting the cryptographic signature. The authentication component 134 can subsequently recover the timestamp by decrypting the cryptographic signature, and can verify that the timestamp is indicative of a time consistent with expected conditions of the remote sensing platform 102. For example, if the timestamp indicates that an image of a scene was captured during daylight hours, but the image depicts the scene at night, an end-user of the computing device 106 can determine based upon the timestamp that a signed image is not a genuine image.

In various exemplary embodiments, the signature component 126 can be configured to append sensor data (e.g., generated by the sensor 152) and/or a timestamp (e.g., generated based upon timing data output by the clock 154) to an image as metadata prior to executing a cryptographic function over the image to generate the cryptographic signature. The authentication component 134 of the computing device 106 can subsequently verify that the sensor data and/or the timestamp indicated in the metadata are genuine readings output by the sensor 152 or the clock 154 when the image was generated or signed by signature component 126, based upon the cryptographic signature. For example, the authentication component 134 can generate a second cryptographic signature by executing a cryptographic function over the signed image, excluding the cryptographic signature included with the signed image. If the second cryptographic signature matches the cryptographic signature included with the signed image, the authentication component 134 can output an indication that the image and/or its accompanying metadata are genuine.

The hardware logic device 114 can further be configured such that the hardware logic device 114 will only sign images if pre-defined environmental conditions (e.g., specified ranges of gravity, ambient pressure, temperature, etc.) are met. These pre-defined conditions can be programmed into the hardware logic device 114 prior to deployment of the remote sensing platform 102 in its operational environment (e.g., in orbit around a celestial body when the remote sensing platform 102 is a spacecraft). The hardware logic device 114 can receive sensor data from the sensor 152, wherein the sensor data is indicative of one or more environmental conditions. If the environmental conditions indicated by the sensor data are not consistent with the pre-defined environmental conditions (e.g., because the conditions indicated by the sensor data fall outside specified ranges), the hardware logic device 114 can be configured not to sign images output by the imaging component 122 or the imaging sensor 112. In some embodiments, the hardware logic device 114 prevents unsigned images from being transmitted to the ground station 104 by way of the transceiver 116. In other embodiments, the hardware logic device 114 can allow the unsigned images to be transmitted to the ground station 104.

It is to be understood that various components included on the remote sensing platform 102 may be "untrusted" components, in that they may be subject to subversion by an attacker or in that their functionality may be controlled by an entity with interests adverse to those of an end-user of imagery generated by the remote sensing platform 102. For example, the remote sensing platform 102 can be a satellite that is owned and/or controlled by a first entity, whereas the computing device 106 can be owned and/or controlled by a second entity. In the example, the second entity may desire to use images generated by the remote sensing platform 102. However, the first entity may desire to deceive the second entity with respect to content of one or more of the images generated by the remote sensing platform 102. In such an example, the first entity can configure the second hardware logic device 138 to modify the contents of images or image data output by the imaging sensor 112 prior to transmitting images to the ground station 104 (and thereon to the computing device 106).

The hardware logic device 114 can further be isolated from other components of the remote sensing platform 102 by way of a trust boundary 125. The trust boundary 125 can be embodied by any of various devices or components in hardware and/or software that are configured to isolate the hardware logic device 114 from devices outside of the trust boundary 125. Stated differently, the trust boundary 125 is intended to prevent subversion of the hardware logic device 114 by components outside the trust boundary 125. For example, the trust boundary 125 can be configured to prevent subversion of the hardware logic device 114 by the second hardware logic device 138. The trust boundary 125 and various other aspects of the system 100 facilitate the ability for a downstream user (e.g., a user of the computing device 106) to determine that images generated by the remote sensing platform 102 are genuine images of a scene (e.g., the scene 118), even when the remote sensing platform 102 is not subject to the downstream user's control.

As noted above, the trust boundary 125 can include various software and hardware components. In an exemplary embodiment, the trust boundary 125 comprises a tamper-evident physical container that physically isolates the hardware logic device 114 from other components of the remote sensing platform 102. In one exemplary application, a tamper-evident container including the hardware logic device 114 can be installed in a remote sensing platform 102 provided by a third party (i.e., an entity other than an entity controlling/installing the hardware logic device 114) for the purpose of generating remote sensing imagery. The tamper-evident container can prevent unauthorized communications and other electrical connections being made between the hardware logic device 114 and other components of the remote sensing platform 102. In a non-limiting example, the tamper-evident container can include input ports that are configured to allow the hardware logic device 114 to receive image data from the imaging sensor 112 and output ports that are configured to allow the hardware logic device 114 to output signed images to the transceiver 116 and/or the hardware logic device 138. In the example, the tamper-evident container can be configured not to include any other input/output (I/O) ports, so as to isolate the hardware logic device 114 from unauthorized signals. In further examples wherein the trust boundary 125 comprises a tamper-evident container, the clock 154 and the sensor 152 can be positioned within the tamper-evident container. The clock 154 and the sensor 152 can therefore be isolated from devices of the remote sensing platform 102 other than the hardware logic device 114

In some exemplary embodiments, the trust boundary 125 can include software elements that provide a secure execution environment for execution of the signature component 126 and/or the imaging component 122. For example, in some embodiments the hardware logic device 114 can include components responsible for functions of the remote sensing platform 102 other than generating signed images (e.g., control of navigation of the remote sensing platform 102, image processing, management of communications by way of the transceiver 116, etc.). In such embodiments, the trust boundary 125 can provide a secure execution environment for functions of the imaging component 122 and the signature component 126, such that software responsible for performing these functions is isolated and inaccessible to software responsible for performing other functions of the remote sensing platform 102.

In various embodiments, the authentication component 134 can be configured to determine whether an image is genuine based upon observed features in the image and the known presence of objects in a scene depicted in the image. For example, based upon an expected trajectory of the remote sensing platform 102, an FOV of the imaging objective 110 can be expected to encompass a known region at a given time. The authentication component 134 can be configured to determine whether an image taken at the given time (e.g., as indicated by a timestamp in metadata of the image) depicts the known region based upon features extracted from the image.

The computing device 106 can receive the signed images 127. The authentication component 134 can be configured to extract a feature from an image in the signed images 127. The image depicts a scene in which an object is known to be present. In a non-limiting example, the image depicts a scene in which a natural geographic feature such as a mountain or a body of water is present. In other examples, the image can depict a scene in which a manmade object, such as a vehicle or a building, is present. The authentication component 134 is configured to determine whether the known object is present in the image based upon the extracted feature. For example, the authentication component 134 can extract a size and color of a region of the image that is expected to correspond to a known body of water. The authentication component 134 can then determine whether the size and color of the region of the image are consistent with the region depicting the known body of water. If the extracted size and color of the region are inconsistent with the region depicting the known body of water, the authentication component 134 can output an indication that the image is not a genuine image of the scene.

In some operational contexts, it may be difficult to automatically extract useful features to identify known objects in a scene depicted in an image. Furthermore, where the presence of the known objects is not a secret, an attacker can replicate a depiction of the known object in a non-genuine image. In exemplary embodiments, therefore, an electromagnetic (EM) signal can be emitted from a scene and toward an expected position of the remote sensing platform 102 at a given time. Emission of the EM signal from the scene can then be detected in an image of the scene captured at the given time. The authentication component 134 can be configured to detect the presence or absence of known EM emitters in a scene depicted in an image, and to determine whether the image is genuine based upon the detected presence or absence of the known EM emitters.

Figure 4:
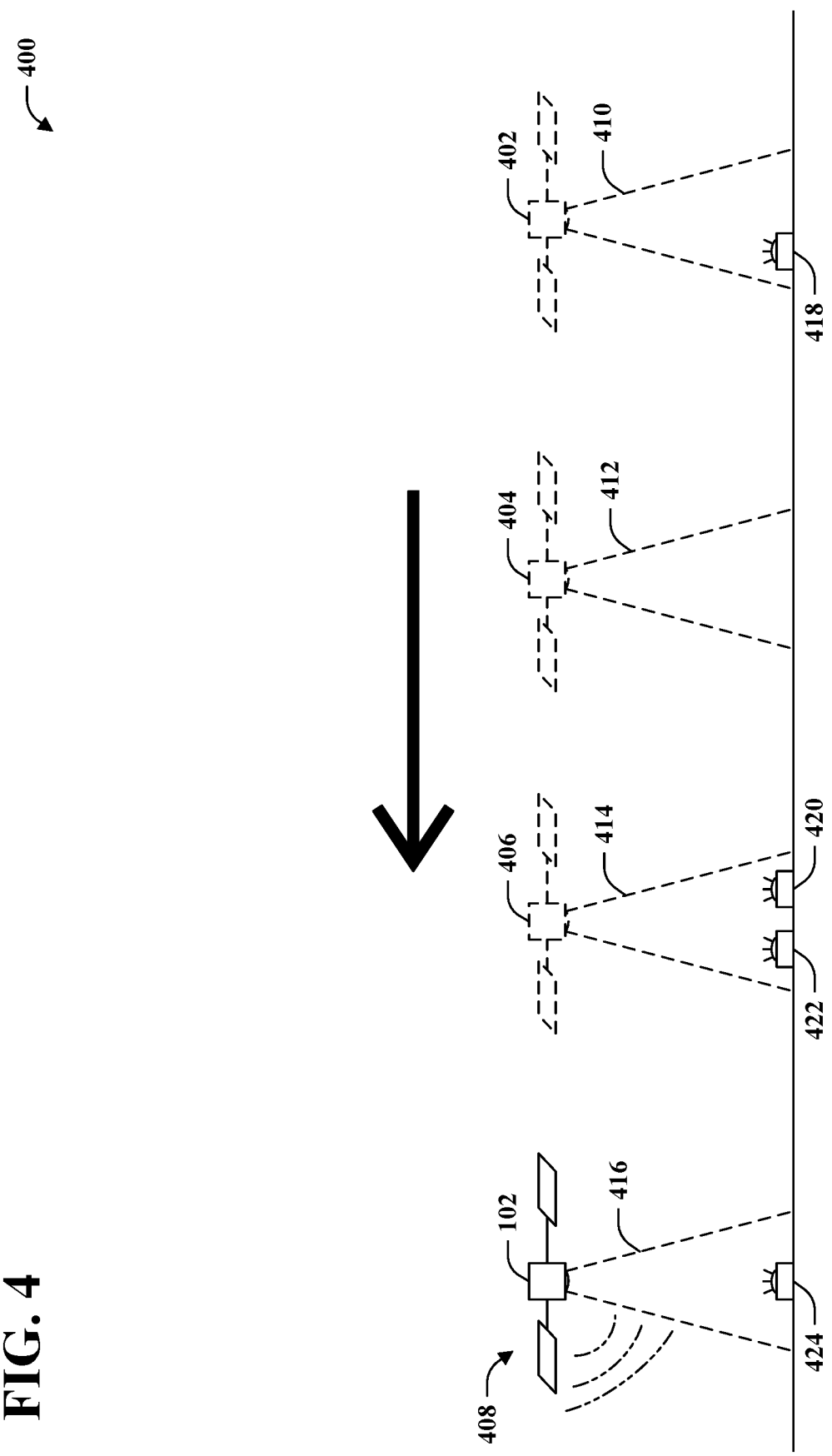
FIG. 4 is a conceptual diagram of an operational region of a remote sensing platform.

Referring now to FIG. 4, a conceptual diagram of an operational region 400 of the remote sensing platform 102 is shown. The conceptual diagram depicts a plurality of positions 402-408 of the remote sensing platform 102 and corresponding FOVs 410-416 of the imaging objective 110 over a period of time. EM emitters 418-424 can be positioned in the operational region 400 of the remote sensing platform 102. As shown in FIG. 4, a first EM emitter 418 is within the FOV 410 of the platform 102 when the platform is at the first position 402. No EM emitter is within the second FOV 412 of the platform 102 when the platform 102 is at the second position 404. Second and third EM emitters 420, 422 are within the third FOV 414 when the platform 102 is at the third position 406. A fourth EM emitter 424 is within the fourth FOV 416 when the platform 102 is at the fourth position 408.

Figure 5:
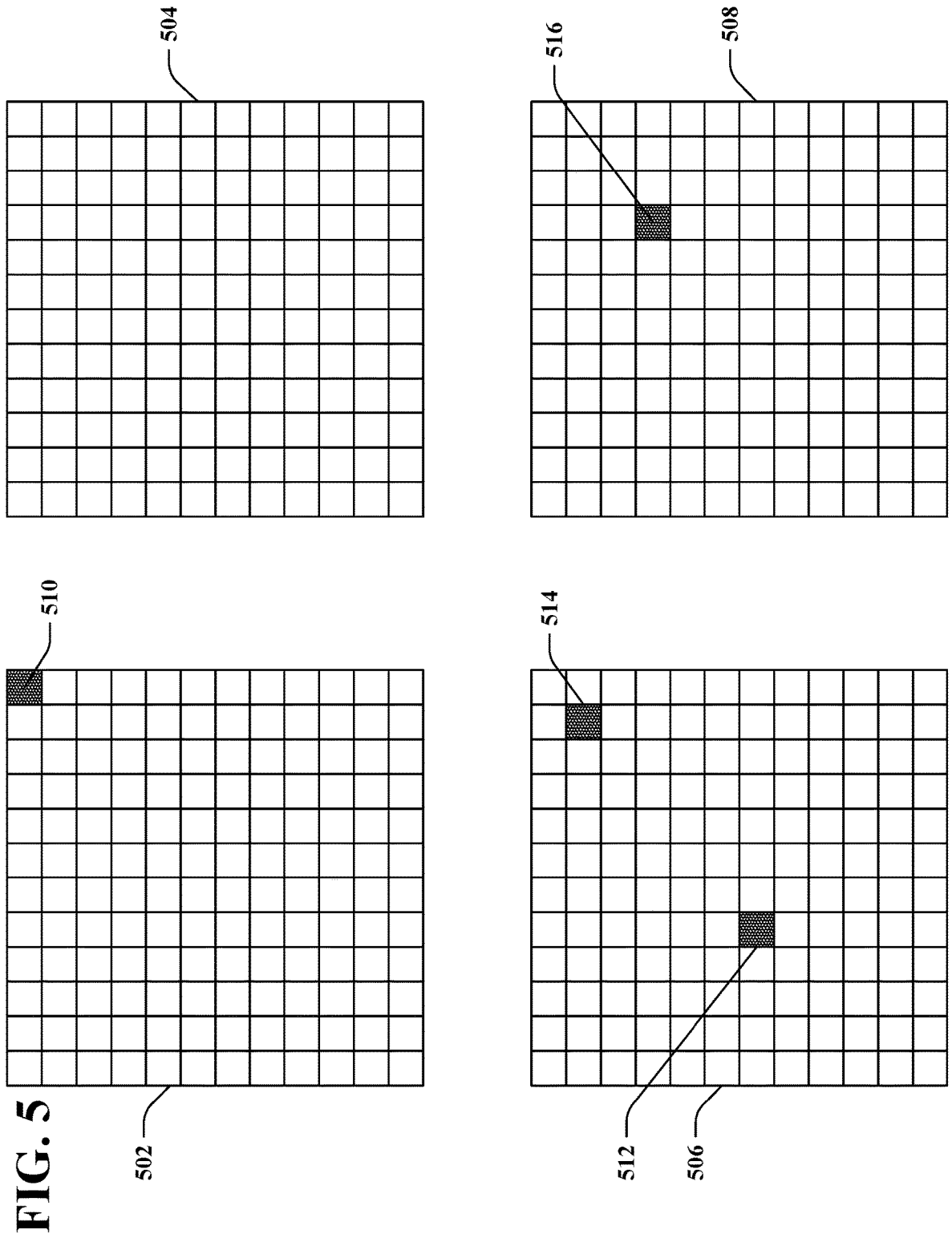
FIG. 5 illustrates a plurality of images of the operational region depicted in FIG. 4.

With reference now to FIG. 5, exemplary images 502-508 of the operational region 400 are shown, corresponding to the FOVs 410-416, respectively. The image 502 includes a pixel 510 that is indicative of EM emissions from the EM emitter 418. The image 504 includes no pixels indicative of EM emissions. The image 506 includes a pixel 512 that is indicative of EM emissions from the EM emitter 420, and a pixel 514 that is indicative of EM emissions from the EM emitter 422. The image 508 includes a pixel 516 that is indicative of EM emissions from the EM emitter 424.

The EM emitters 418-424 can be controlled such that the presence or absence of EM signals emitted by the EM emitters 418-424 at different times is not predictable by an attacker. Thus, the presence or absence of EM emitters in a scene depicted in an image functions as a secret signature in the image that is detectable by the authentication component 134. The EM emitters 418-424 can further be configured to direct their EM emissions toward an expected location of the remote sensing platform 102. This can provide higher assurance that the remote sensing platform 102 is in its expected location, and further can provide security against interception and relay of the pattern of presence or absence of EM emitters by an attacker (e.g., for use in generating non-genuine, falsely signed images).

A type of EM radiation that is emitted by the emitters 418-424 can be selected based upon a range of EM frequencies to which the imaging sensor 112 of the remote sensing platform 102 is sensitive. For instance, if the imaging sensor 112 is a visual-spectrum imaging sensor, the EM emitters 418-424 can be configured to emit visible light. By way of example, and not limitation, the EM emitters 418-424 can be light-emitting diodes (LEDs) or lasers. In other examples, the EM emitters 418-424 can be infrared (IR) or ultraviolet (UV) emitters in embodiments wherein the imaging sensor 112 is configured to be sensitive to IR or UV light, respectively. In still further examples, the EM emitter 418-424 can instead be EM reflectors (e.g., mirrors) that reflect light from the sun rather than emitting light directly.

Referring once again to FIG. 1, the authentication component 134 receives an image that depicts a scene in which an EM emitter is known to be operating. The authentication component 134 can detect the presence of the EM emitter in the scene based upon the image data. For example, the EM emitter may be represented by a pixel in the image that has a higher intensity than other pixels, or a distinct detectable signature (e.g., based upon a known operating frequency of the EM emitter), and the authentication component 134 can be configured to detect the presence of the EM emitter based upon the pixel. Responsive to detecting the EM emitter, the authentication component 134 can output an indication that the image is genuine. Alternatively, responsive to failing to detect the known presence of the EM emitter, the authentication component 134 can output an indication that the image is not genuine. In some embodiments, the presence of an EM emitter in a scene depicted in a signed image can be associated with one or more specific times. For instance, the EM emitter can be configured to emit an EM signal toward the remote sensing platform 102 at a first time, but not at a second time. In such embodiments, the authentication component 134 can be configured to evaluate whether a signed image is genuine based upon a timestamp included in the signed image and a known presence or absence of EM emitters at a time indicated by the timestamp. To facilitate time-based authentication of a signed image by the authentication component, the computing device 106 can include a clock (not shown) that is synchronized to the clock 154 of the hardware logic device 114.

The authentication component 134 can further be configured to detect the presence of EM emitters across multiple images captured by the remote sensing platform 102 over a period of time. By way of example, the computing device 106 can receive the plurality of signed images 127 from the remote sensing platform 102 by way of the ground station 104. The authentication component 134 can detect the presence of EM emitters in scenes depicted in the signed images 127. Based upon the detected EM emitters in the signed images 127, the authentication component 134 can identify a message defined by the detected emitters. By way of example, and not limitation, a pattern of EM emitters in a first signed image in the signed images 127 can be indicative of a first value, a pattern of EM emitters in a second signed image in the signed images 127 can be indicative of a second value, and a pattern of EM emitters in a third signed image in the signed images 127 can be indicative of a third value. Collectively, the first, second, and third values define a message that is interpretable by the authentication component 134. The authentication component 134 can compare the message defined by EM emitters observed in the signed images 127 against a known message established by the EM emitters (e.g., the emitters 418-424) during a time when the signed images 127 were captured. The authentication component 134 can determine that the remote sensing platform 102 and the hardware logic device 114 are in an expected position above the scenes depicted in the signed images 127. This can help to establish that the hardware logic device 114 is actually aboard the remote sensing platform 102 and signing images generated by the remote sensing platform 102, rather than being held by an attacker at a different location and being fed false data.

In some embodiments, the server computing device 302 can be configured to periodically authenticate that images received from the remote sensing platform 102 are genuine images based upon observed features, such as the EM emitters, in a manner similar to that discussed above with respect to the computing device 106 and the authentication component 134. By authenticating that EM emitters that are present in a scene are accurately depicted in signed images of the scene generated by the remote sensing platform 102, the server computing device 302 can determine that the hardware logic device 114 is actually present on the remote sensing platform 102 and signing images that are actually generated by the remote sensing platform 102. Thus, the server computing device 302 can determine that the signed images 301 that can be accessed by the computing devices 106, 304-308 are likely to be genuine images. The server computing device 302 may be a trusted computing device or controlled by a trusted entity relative to the computing devices 106, 304-308. Accordingly, in some exemplary embodiments, responsive to one of the computing devices 106, 304-308 requesting one of the signed images 301 from the server computing device 302, the server computing device 302 can output the requested signed image and an indication that the signed image is genuine. The server computing device 302 can therefore function as a downstream evaluator of whether the signed images 301 are genuine, such that the individual computing devices 106, 304-308 do not need to conduct independent evaluations of each of the signed images 301 that they receive.

In some embodiments, the presence of the hardware logic device 114 on the remote sensing platform 102 can be verified based upon a challenge issued to the remote sensing platform 102 from the ground station 104. The ground station 104 can transmit, by way of the transceiver 128, a first communication to the remote sensing platform 102, wherein the first communication includes challenge data. The remote sensing platform 102 can receive the first communication at the transceiver 116. The transceiver 116 can be configured to provide the first communication to the hardware logic device 114. In alternative embodiments, the transceiver 116 can output the first communication to the second hardware logic device 138 and the second hardware logic device 138 can provide the first communication to the first hardware logic device 114. Responsive to receipt of the first communication at the first hardware logic device 114, the signature component 126 can sign the first communication to generate a second communication. By of example, and not limitation, the signature component 126 can execute a cryptographic function over the first communication based upon a private key (e.g., output by the PUF 136). An output of the cryptographic function is an encrypted form of the first communication, and the second communication comprises the encrypted form of the first communication. The signature component 126 can output the second communication to the transceiver 116 (e.g., directly to the transceiver 116, or to the transceiver 116 by way of the hardware logic device 138), whereupon the transceiver 116 transmits the second communication to the ground station 104.

Responsive to receipt of the second communication at the ground station 104, the ground station computing device 142 can authenticate the second communication. For example, the ground station computing device 142 can decrypt the second communication based upon a public key associated with the hardware logic device 114. The decrypted second communication, if signed by the hardware logic device 114 with its private key, will match the first communication. Therefore, if the ground station computing device 142 determines that the decrypted second communication matches the first communication that was transmitted to the remote sensing platform 102, the operator of the ground station 104 can determine that the hardware logic device 114 is actually mounted on the remote platform 102 (e.g., rather than being held by an attacker and provided with false data). In exemplary embodiments, responsive to determining that the decrypted second communication matches the first communication, the ground station computing device 142 can output an indication that the hardware logic device 114 is positioned on the remote sensing platform 102. It is to be understood that authentication of the second communication can instead be performed by any of the computing devices 106, or 302-308. In some embodiments, the hardware logic device 114 can include, appended to or as part of the encrypted second communication, a value output by the clock 154. In such embodiments, the ground station computing device 142 can further be configured to authenticate that the value output by the clock 154 is a correct value, thereby mitigating the risk that the clock 154 associated with the hardware logic device 114 is compromised.

From the foregoing description, it is to be appreciated that images signed by the hardware logic device 114 using a cryptographic signature can be determined to be authentic even in embodiments wherein the remote sensing platform 102, the ground station 104, or the network 310 are untrusted. Provided that the hardware logic device 114 is coupled to the imaging sensor 112 in a secure manner (i.e., the hardware logic device 114 receives true image data from the imaging sensor 112), and the trust boundary 125 is not compromised, the cryptographic signature included in a signed image can be used to detect alterations to the signed image, whether such alterations are made by other components of the remote sensing platform 102, the ground station 104, a component of the network 310, or the computing devices 304-308.

Figure 6:
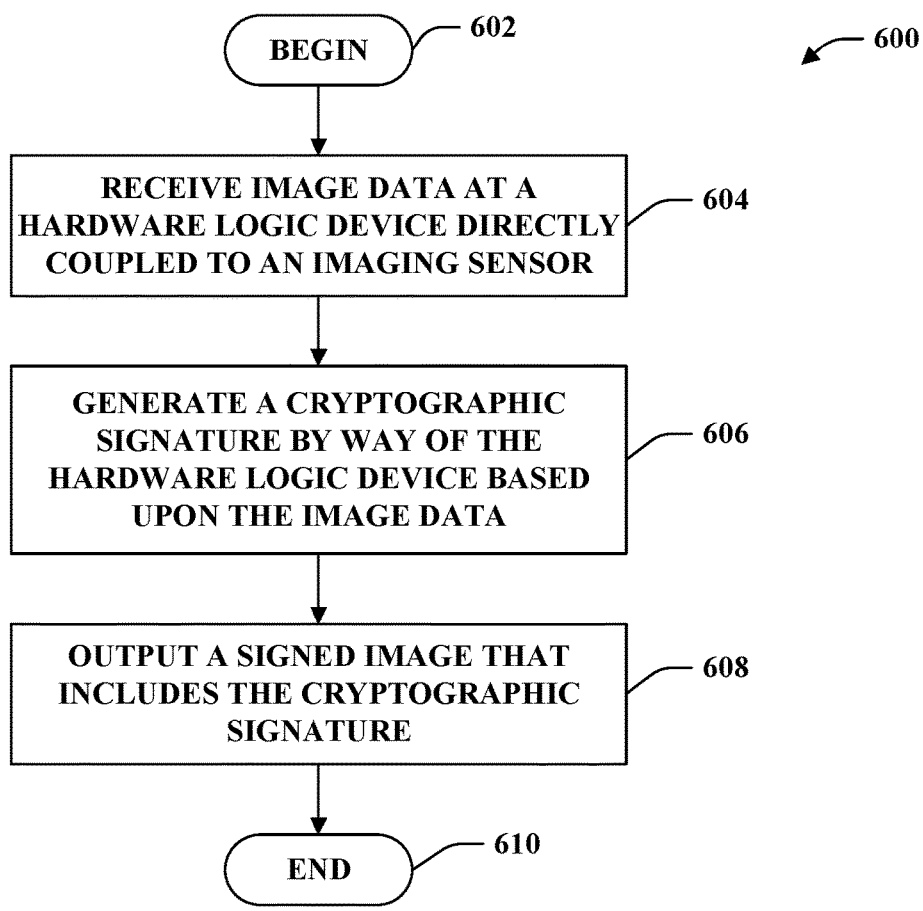
FIG. 6 is a flow diagram that illustrates an exemplary methodology for generating signed remote sensing imagery that can be authenticated by downstream users.
Figure 7:
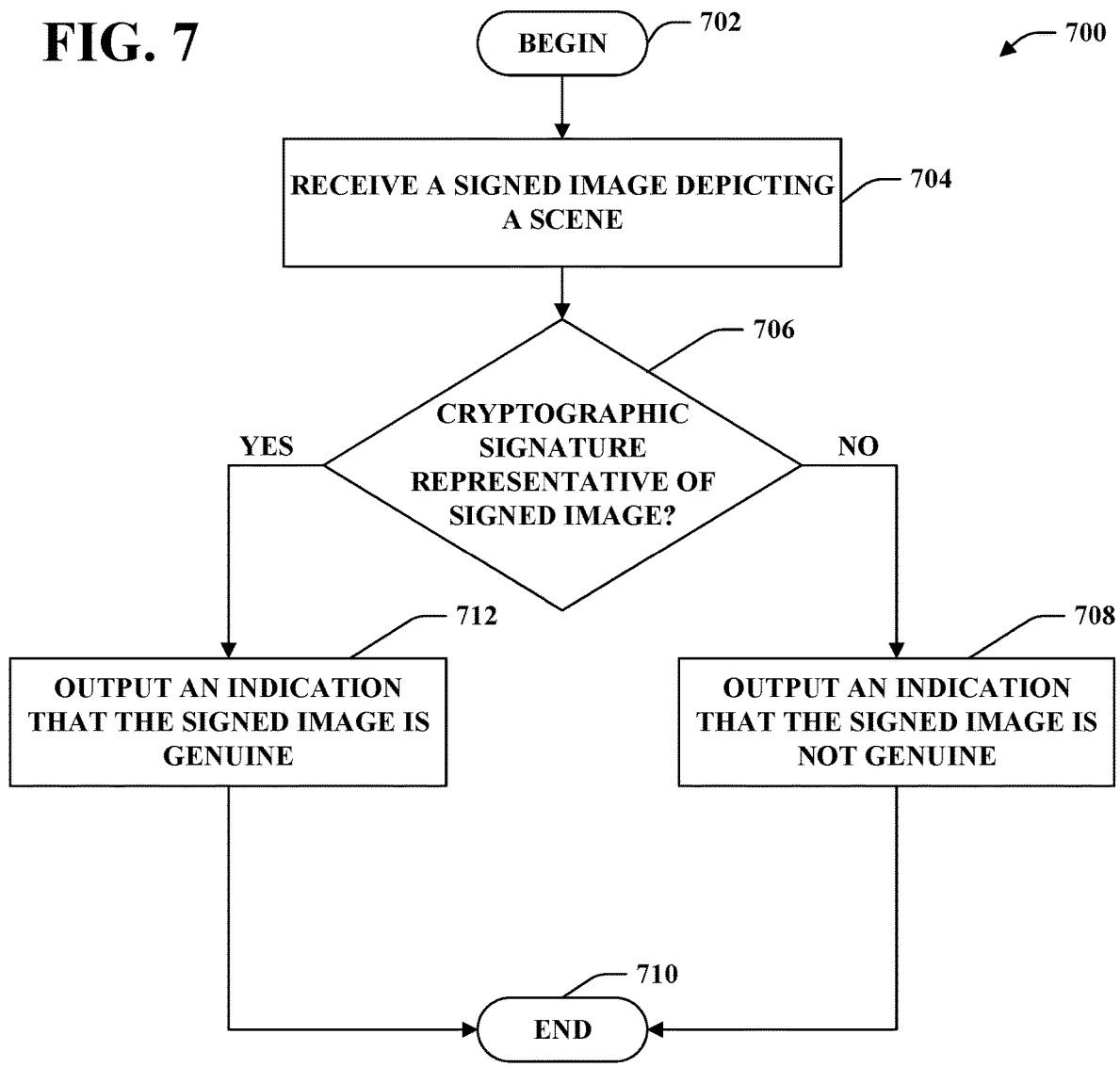
FIG. 7 is a flow diagram that illustrates an exemplary methodology for authenticating cryptographically signed remote sensing images.

FIGS. 6 and 7 illustrate exemplary methodologies relating to authenticating imagery generated by remote sensing systems. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 6, a methodology 600 that facilitates generating signed images that can be subsequently authenticated by downstream users is illustrated. The methodology 600 begins at 602, and at 604, image data is received at a hardware logic device that is directly coupled to an imaging sensor. The hardware logic device is mounted on a same platform as the imaging sensor (e.g., a spacecraft or an aircraft) and is coupled to the imaging sensor such that the hardware logic device receives the image data from the imaging sensor rather than any intermediary devices. At 606, the hardware logic device generates a cryptographic signature based upon the image data. In some embodiments, the hardware logic device generates the cryptographic signature by executing a cryptographic function over the image data. In other embodiments, the hardware logic device generates the cryptographic signature by extracting a feature from the image data to generate feature data, and executing a cryptographic function over the feature data. At 608, the hardware logic device outputs a signed image that includes the image data and the cryptographic signature. The signed image can be authenticated by a downstream user of the signed image based upon the cryptographic signature, as described in greater detail below with respect to FIG. 7. The methodology 600 ends at 610.

Referring now to FIG. 7, a methodology 700 that facilitates authenticating a signed image is illustrated. The methodology 700 begins at 702, and at 704, a signed image that depicts a scene is received. The signed image includes image data and a cryptographic signature. At 706, a determination is made whether the cryptographic signature of the signed image is representative of the image data of the signed image. In some embodiments, the determination whether the cryptographic signature is representative of the image data can be made by decrypting the cryptographic signature. If the decrypted cryptographic signature is the same as the image data, the cryptographic signature is representative of the image data. In other embodiments, the determination whether the cryptographic signature is representative of the image data can be made by executing a cryptographic hash function over the image data to generate a cryptographic hash. The cryptographic hash can then be compared to the cryptographic signature. If the cryptographic hash does not match the cryptographic signature, the cryptographic signature is determined not to be representative of the signed image. At 706, if the cryptographic signature is not representative of the signed image, the methodology 700 proceeds to 708, whereupon an indication that the signed image is not genuine is output, and the methodology 700 ends 710. If, at 706, the cryptographic signature is representative of the signed image, the methodology 700 proceeds to 712 and an indication that the signed image is genuine is output, whereupon the methodology 700 ends 710. In some embodiments, no action is taken responsive to determining that the cryptographic signature is genuine at 706.

Figure 8:
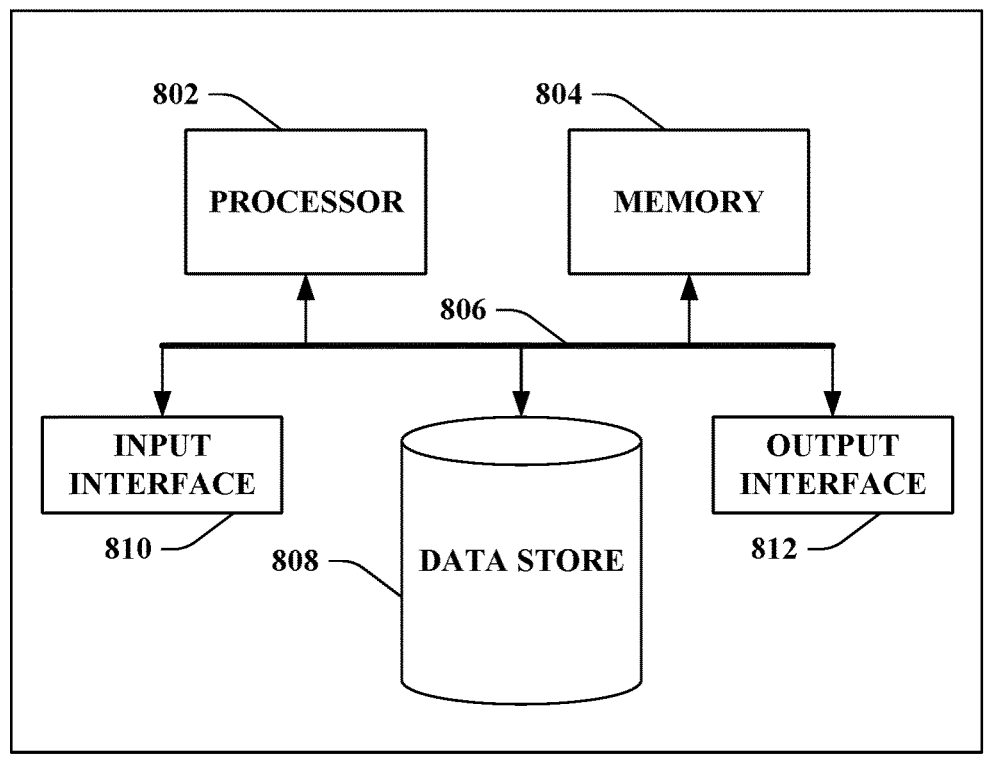
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in a system that facilitates authenticating signed images. By way of another example, the computing device 800 can be used in a system that maintains a ledger of public cryptographic keys. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store images, cryptographic keys, extracted image features, etc.

The computing device 800 additionally includes a data store 808 that is accessible by the processor 802 by way of the system bus 806. The data store 808 may include executable instructions, cryptographic keys, images, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc., by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include FPGAs, ASICs, Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A system, comprising:
a hardware logic device included in an airborne vehicle, wherein the hardware logic device is directly coupled to an imaging sensor, the hardware logic device configured to perform acts comprising:

receiving image data from the imaging sensor, the image data indicative of a scene in a field-of-view (FOV) of an objective coupled to the imaging sensor;

in response to receiving the image data, providing input to a physical unclonable function (PUF) that is included in the hardware logic device, wherein the PUF generates an output bases upon the input;

generating a cryptographic signature based upon the image data and a private key, wherein the private key is based upon the output of the PUF; and outputting a signed image for transmission to a remote computing system, the signed image depicting the scene, wherein the signed image includes the cryptographic signature, and further wherein the signed image is authenticatable as a genuine image of the scene based upon the cryptographic signature.

2. The system of claim 1, further comprising the imaging sensor and the objective, wherein the hardware logic device, the imaging sensor, and the objective are mounted on the airborne vehicle.

3. The system of claim 2, wherein the airborne vehicle is a spacecraft.

4. The system of claim 3, further comprising a transceiver, the acts further comprising:

responsive to receiving a first communication from the transceiver, the first communication received from a ground station by the transceiver, generating a second communication by signing the first communication based upon the private key; and outputting the second communication to the transceiver, whereupon the transceiver transmits the second communication to the ground station, wherein the ground station authenticates that the hardware logic device is mounted on the platform based upon the second communication.

5. The system of claim 1, further comprising a sensor mounted included in the airborne vehicle, wherein the cryptographic signature is based further upon sensor data output by the sensor.

6. The system of claim 5, wherein the sensor comprises at least one of a gravimeter, an inertial measurement unit (IMU), an accelerometer, a temperature sensor, or a pressure sensor.

7. The system of claim 5, wherein the hardware logic device and the sensor are disposed within a tamper-evident container.

8. The system of claim 1, the acts further comprising extracting a feature from the image data, wherein generating the cryptographic signature is based upon the extracted feature.

9. The system of claim 1, wherein the output of the PUF is the private key.

10. The system of claim 1, the acts further comprising generating the private key based upon the output of the PUF.

11. The system of claim 1, wherein generating the cryptographic signature comprises executing a cryptographic function over data that includes the image data.

12. The system of claim 1, the image data comprising a plurality of analog signals output by light-sensitive pixel cells (LSPCs) included on the imaging sensor, the acts further comprising digitally sampling the analog signals to generate digital image data, wherein generating the cryptographic signature is based on the digital image data.

13. A method performed by a hardware logic device that is included in an airborne vehicle, the method; comprising:

receiving, from an imaging sensor and at a hardware logic device that is directly coupled to the imaging sensor, image data that is indicative of a scene in a field-of-view (FOV) of an imaging objective;

in response to receiving the image from the imaging sensor, providing an input to a physical unclonable function (PUF), wherein the PUF generates an output bases upon the input;

generating a cryptographic signature based upon the image data and a cryptographic key, wherein the cryptographic key is based upon the output generated by the PUF; and outputting, by way of the hardware logic device, a signed image that depicts the scene, wherein the signed image is output for transmission to a remote computer device, the signed image comprising the image data and the cryptographic signature, and further wherein the signed image is authenticatable as a genuine image of the scene based upon the cryptographic signature.

14. The method of claim 13, further comprising extracting a feature from the image data, wherein generating the cryptographic signature comprises executing a cryptographic function over the extracted feature.

15. A system included in an airborne vehicle, the system comprising:

an image sensor that generates an image of a portion of a surface of the earth;

an inertial sensor;

a clock; and a hardware logic device that is directly coupled to the image sensor and is in communication with the inertial sensor and the clock, wherein the hardware logic device includes memory that stores an input, the hardware logic device includes a physical unclonable function (PUF), and further wherein the hardware logic device is configured to perform acts comprising:

receiving the image generated by the image sensor;

in response to receiving the image:

obtaining a sensor output generated by the inertial sensor;

obtaining a time value output by the clock;

appending the sensor output and the time value to the image to form image data;

providing the PUF with the input stored in the memory, wherein the PUF generates an output based upon the input;

generating a cryptographic signature for the image based upon the image data and a cryptographic key, wherein the cryptographic key is based upon the output generated by the PUF;

generating an image file, where the image file includes the image generated by the image sensor and the cryptographic signal; and outputting the image file for transmission to a ground-based remote computing system, wherein the image is authenticatable by the ground-based remote computing system based upon the cryptographic signature.

16. The system of claim 15, wherein the output of the PUF is the cryptographic key.

17. The system of claim 15, the acts further comprising:

providing the output of the PUF to a key generator algorithm, wherein the key generator algorithm outputs the cryptographic key based upon the output of the PUF.

18. The system of claim 15, wherein the hardware logic device, the sensor, and the clock are included in a tamper-evident container that separates the hardware logic device, the sensor, and the clock from the image sensor.

19. The system of claim 18, wherein the tamper-evident container ports, wherein the ports consist of:
- an input port, wherein the hardware logic device is directly coupled to the image sensor by way of the input port; and
- an output port, wherein the hardware logic device is directly coupled to a transceiver by way of the output port.

20. The system of claim 15, wherein the inertial sensor is a gravimeter.

* * * * *